United States Patent [19]

Kahn

[11] 4,070,510
[45] Jan. 24, 1978

[54] AQUEOUS POLISH COMPOSITION

[75] Inventor: Joe E. Kahn, Hartland, Wis.

[73] Assignee: Acme Chemical Company, Milwaukee, Wis.

[21] Appl. No.: 666,203

[22] Filed: Mar. 12, 1976

[51] Int. Cl.$^2$ .............................................. B05D 3/02
[52] U.S. Cl. ..................... 427/385 R; 260/29.6 MN; 260/29.6 ME; 424/7; 428/500; 106/6; 106/8; 106/10; 106/230; 106/238; 260/23 R; 260/23 AC; 260/23 XA; 260/23 S; 260/27 R; 260/28.5 A; 260/28.5 AV; 260/28.5 B; 260/28.5 D; 260/28.5 R; 260/29.6 R
[58] Field of Search .................... 106/6, 8, 10, 106/230, 238; 424/7; 260/23 R, 23 AM, 23 XA, 23 S, 27 B, 28.5 A, 28.5 AV, 28.5 B, 28.5 D, 28.5 R, 29.6 R, 29.6 MN, 29.6 ME; 427/385 R; 428/500

[56] References Cited

U.S. PATENT DOCUMENTS

| 3,467,610 | 9/1969 | Fiarman et al. ..................... 260/22 |
| 3,808,036 | 4/1974 | Zdanowski ......................... 260/27 R |
| 3,933,511 | 1/1976 | Heintzlman et al. ............ 260/28.5 A |

*Primary Examiner*—Melvyn I. Marquis
*Attorney, Agent, or Firm*—Michael, Best & Friedrich

[57] ABSTRACT

The aqueous base polish composition, which is particularly adaptable for use as a household floor polish, contains a non-volatile, solid film former, such as an acrylic copolymer, dispersed in the aqueous phase or base, a water-soluble, acid-base indicator, such as thymolphthalein, which is colored at a pH above a predetermined level and is colorless at a lower pH, in a sufficient amount to impart a distinctive original color to the composition and a sufficient amount of an alkaline material, such as potassium hydroxide, to raise the overall pH of the composition above that predetermined level, e.g., above about 11 or higher. Upon being applied on the surface of flooring, the colored polish composition retains its original color for a finite period of time while in the liquid state, e.g., 30 seconds to 2 minutes, and becomes colorless as the water evaporates during formation of a protective film finish. The color indicator becomes an integral part of the dried clear and colorless film. Upon the application of an aqueous cleaning or stripping solution used for removing one or more coats of the dried film after use and having a pH above a determined level, the film reverts to the original color of the composition so that one can readily observe whether the old film has been completely removed before the floor becomes dry.

The film former can include optional ingredients, such as a wax, an alkali-soluble resin and a permanent plasticizer to improve the wear resistance and finish properties of the resultant film. The polish composition can also include fugitive plasticizers or coalescing aids to facilitate the formation of a smooth, continuous protective film and a chelating agent to increase the color retention time after application.

23 Claims, No Drawings

AQUEOUS POLISH COMPOSITION

BACKGROUND OF THE INVENTION

This invention relates to coating compositions and more particularly to aqueous base polish compositions which are applied to a surface, such as a floor or the like, and dry as a substantially clear, protective film finish.

Conventional aqueous base polish compositions, particularly floor polish compositions, are relatively low in viscosity and, although they possess a milky grayish color when in bulk liquid form, are virtually transparent as water when spread on resilient flooring. This oftentimes makes it difficult for the user to easily observe missed spots during application. Areas missed in application are noticed only after the water has evaporated and the film is set. During recent years the trend has been towards the use of more clear finishes and lighter colored resilient flooring and these two factors make the problem of "missed spots" even more acute.

A second problem encountered with conventional aqueous base floor polishes is in stripping, i.e., the removal of the dried film, or more often several coats of built-up dried film, after dirt has become embedded therein. Various compositions are marketed to clean or strip and typically are aqueous dispersions or are diluted in water. When they are applied to the floor to remove the film, usually in combination with physical surface abrasion, the entire surface becomes wet and one cannot readily observe where the old film has been completely removed until the floor becomes dry. After drying the non-uniform removal becomes apparent and reapplication of the cleaner or stripper is required. In typical household use, up to as many as three or four applications of the cleaning or stripping composition may be required to completely remove the old film.

SUMMARY OF THE INVENTION

A primary object of the invention is to provide an aqueous base polish composition having an original distinctive color which is retained while the composition is in the liquid state but disappears to provide a substantially clear film as the water evaporates after application.

A further object of the invention is to provide such a polish composition wherein the film, after use, will revert to its original color upon the application of a relatively high alkalinity cleaning or stripper composition.

Other objects and advantages of the invention will become apparent upon reviewing the following detailed description and the appended claims.

The polish composition of the invention is driable to a substantially clear finish and includes an aqueous phase or base, a dispersed, non-volatile, solid film former capable of being deposited in a smooth protective film on a substrate upon evaporation of the water of the aqueous phase, a sufficient quantity of a dispersing agent to form a stable dispersion of the film former in the aqueous phase and permit the film former to deposit therefrom as a smooth film on the substrate upon evaporation of the water, a water-soluble, acid-base indicator, which is colored at a pH above a predetermined level and is colorless at a lower pH, in a sufficient quantity to impart a distinctive color to the composition, and a sufficient quantity of an alkaline material to raise the overall pH of the polish composition above said predetermined level without adversely affecting the stability of the dispersed film former. The original color provided by the color indicator is retained for a finite period of time while the polish composition is still in a liquid state after application of a substrate and disappears, i.e., becomes colorless, as the water evaporates during film formation. Thus, this temporary coloration of the polish composition permits the user to readily observe any missed spots during application. The color indicator becomes an integral part of the protective film so that, upon the application of a cleaning or stripper composition having a relatively high alkalinity, the film reverts to the original color of the polish composition at the time of application. This permits one to readily observe whether the old film has been completely removed before drying.

DESCRIPTION OF THE PREFERRED EMBODIMENTS

The temporary coloring feature provided by the invention can be incorporated into most conventional aqueous base polish compositions, either non-buffable, self-polishing or buffable types, which dry to a substantially clear finish and include non-volatile, solid film formers dispersed in the aqueous base and an emulsifying and dispersing agent for dispersing the film former in the aqueous phase or base. The emulsifying and dispersing agent, which preferably is anionic or nonionic, serves a well known function and is present in an amount sufficient to form a stable dispersion of the film former in the aqueous base and permit the film former to deposit therefrom upon evaporation of the water. The term "dispersion" as used herein broadly encompasses systems wherein the film former is uniformly dispersed throughout the aqueous phase as an emulsion, as a colloidal suspension, as a solute, or a combination thereof, e.g., partially in solution and partially in emulsion form.

As is well known in the art, various other ingredients can be included in aqueous base polish compositions, such as plasticizers to facilitate film formation at room temperature and/or improve flexibility, surfactants or wetting agents to further facilitate the deposition of a smooth, continuous film, and alkali-soluble resins to facilitate eventual removal of the polish film and/or improve gloss. The only important limitations for the type of specific conventional ingredients used are that the resultant dispersion must remain stable at the relatively high pH levels required to effect the color change of the color indicator, the ingredients do not impart a coloration which will mask the color provided by the color indicator, the ingredients do not completely inhibit the required reaction of the color indicator to provide the desired original color, and a substantially clear film is provided upon drying.

The color indicators used in the polish compositions of the invention are conventional water-soluble, acid-base indicators which are colored in the basic or alkaline state and are colorless at a lower pH. Representative examples of suitable color indicators and the color imparted thereby include thymolphthalein (blue), phenolphthalein (reddish pink), ortho-cresolphthalein (red), ethyl bis (2,4-dinitrophenyl) acetate (blue-green), p-nitrophenol (yellow), m-nitrophenol (yellow), m-dinitrophenol (yellow), 1,3,5-trinitrophenol (orange), and 2,4,6-trinitrophenol (orange). Thymolphthalein, phenolphthalein, ortho-cresolphthalein and ethyl bis (2,4-dinitrophenyl) acetate are preferred because they provide a more vivid color which is readily visible when the polish composition is applied to a wider variety of different colored substrates with thymolphthalein being the most preferred.

The amount of color indicator used depends primarily upon the specific one selected, the degree of original coloration desired in the polish composition, and the desired time for color retention after application. Amounts within the range of about 0.003 to about 2 weight %, based on the total weight of the composition, generally are preferred. Amounts less than about 0.003 weight % will provide some coloration; however, the degree of coloration may not be vivid enough to be readily discernible when the polish composition is applied on a non-white substrate. While amounts higher than 2 weight % can be used, such larger amounts provide little or no additional coloration and thus, represent an unnecessary additional cost. The most preferred amount of the color indicator is within the range of about 0.06 to about 0.5 weight %, based on the total weight of the composition.

It has been found that the pH of the polish composition must be increased to a level above that normally required for the above-mentioned acid base indicators to change from a colorless to a definite color. For instance, in a simple alkaline solution, it has been reported and confirmed by laboratory tests that thymolphthalein changes from colorless to a blue color within a pH range of 9.4 to 10.6, phenolphthalein changes from a colorless to a pink color within a pH range of 8.4 to 10.0, ortho-cresolphthalein changes from colorless to a reddish purple color within a pH range of 8.1 to 9.9 and ethyl bis (2,4-dinitrophenyl) acetate changes from colorless to a blueish green within a pH range of 8.4 to 9.6. When thymolphthalein is used as the color indicator in the polish composition of this invention, the overall pH of the composition usually should be at least 11.6 to obtain a vivid blue. When phenolphthalein, ortho-cresolphthalein, or ethyl bis 2,4-dinitrophenyl) acetate, is used as the color indicator, the overall pH of the polish composition usually should be at least 10.5 to obtain a reddish pink color, a reddish purple color, and a blueish green color, respectively. While it is not fully understood why this higher pH is required, it appears that the various resins, polymers and waxes commonly used as film formers, and possibly some of the other polish ingredients, somehow tend to inhibit the normal disassociation of the acid-base indicators.

Generally, it is preferred to increase the overall pH of the polish composition above these minimum levels because a more vivid, longer lasting color can be provided. Accordingly, a minimum pH of about 12 is preferred when thymolphthalein is used as the color indicator and a minimum pH of about 11 is preferred when any of the other above-mentioned acid-base indicators is used. The upper limit for the pH of the polish composition is governed primarily by the specific color indicator used, the other ingredients included in the polish composition and government regulations relating to permissible alkalinity levels. That is, it is well known that, some of the color indicators begin to become colorless at a higher pH, some conventional aqueous base polish formulations tend to become unstable at higher pH levels and government regulations require special handling and labeling precautions when a product which might come in contact with the users skin exceeds certain pH or alkalinity levels. Generally, the pH of the polish composition should not be higher than about 12.9.

Various suitable alkaline materials can be used to adjust the overall pH of the polish composition to the level required to activate the color indicator. To perform this function, the alkaline material must be capable of solubilizing in the aqueous dispersion and reacting with the acid-base indicator to form the well known reaction products thereof which provide the desired color. Generally, alkaline or buffering agents commonly used in available alkaline wax emulsions incorporated into conventional aqueous base polish compositions can be used. However, relatively volatile alkaline materials, such as amines and ammonia, tend to decrease the time of color retention after application. Also, the presence of significant amounts of amines in the resultant film tend to cause a yellowing with time. Therefore, such alkaline materials are considered not to be particularly desirable as the sole alkaline material used for adjusting the pH, although they can be used in lesser amounts in combination with other non-volatile alkaline materials. Representative examples of particularly suitable alkaline materials include the hydroxides, carbonates, bicarbonates and borates of alkali metals, such as sodium hydroxide, potassium hydroxide, lithium hydroxide and borax, and mixtures thereof. Of these, the hydroxides of alkali metals are preferred with sodium hydroxide and potassium hydroxide being the most preferred.

The film former used generally can be any conventional non-volatile, solid film formers which are emulsifiable or dispersible in conventional emulsifying and dispersing agents including waxes, synthetic polymers, natural and synthetic resins, particularly alkali-soluble resins, and mixtures thereof.

Representative examples of suitable natural and synthetic resins and polymers include shellac, manila loba, polyvinyl acetate, polyvinyl chloride-acetate, polyvinyl chloride, copolymers of vinylidene chloride and acrylonitrile, terpene resins, terpene phenolic resins, copolymers of vinyl acetate and crotonic acid, copolymers of butadiene and styrene, polyvinylidene chloride, polyacrylates, shellac-modified polystyrenes, polyurethanes, terpolymer latexes of the type disclosed in U.S. Pat. No. 3,406,133, acrylic interpolymers of the type disclosed in U.S. Pat. No. 3,429,842 and metal complexed or ionic-crosslinked polymers of the type disclosed in U.S. Pat. Nos. 3,808,036 and 3,467,610, particularly acrylic copolymers which are ionic-crosslinked with a water-soluble polyvalent metal compound, such as zinc or zirconium. Acrylic interpolymers or copolymers, particularly the metal complex or ionic-crosslinked type, and mixtures thereof are the preferred synthetic polymer film formers because of their high detergent resistance, better recoating properties and ease of removal with an alkaline cleaner or stripper composition. Even though some of these copolymers may be soluble in the resultant aqueous dispersion of the polish composition because of the relatively high pH thereof, they are commonly called water insoluble polymers.

Many synthetic polymer film formers are commercially available as emulsions or dispersions which can be included as part of the polish composition as is without the addition of any further emulsifying and dispersing agents. Representative examples of such commercially available acrylic polymer and copolymer emulsions or dispersions include Rhoplex B-832, Rhoplex B-1141 and Acrysol WS-24 supplied by Rohm and Haas Company, Richamer R-724 and Richamer R-900 supplied by The Richardson Company, Ionac X-180 and Crilicon 642 supplied by Ionac Chemical, and Neocryl A-602 supplied by Polyvinyl Chemical Industries. Similarly, many alkali-soluble synthetic resins are commercially available as emulsions or dispersions, such as Acrysol 527 supplied by Rohm and Haas Company, which can be included as part of the polish composition as is without the addition of any further emulsifying and dispersing agents. Many of these commercially available compositions typically employ an anionic emulsifying system and have a pH ranging from about 6 to 11 while others may have a pH as low as 3.0 or lower and employ a nonionic emulsifying system.

While not necessary for some applications, a wax or mixture of waxes can be included as part of the film former to improve scuff, scratch and black mark resistance. For a non-buffable, self-polishing composition, the amount of wax used should not be over about 8 weight %, based on the total weight of the composition, preferably within the range of about 0.5 to 6 weight %. For a buffable composition, the wax content should be at least 8 weight %. Representative examples of suitable waxes or mixture waxes include waxes of a vegetable, animal, synthetic, and/or mineral origin, or mixtures thereof. These waxes are well known in the art and include carnauba, candelilla, lanolin, cocoa butter, cottonseed, stearin, Japan wax, bayberry, myrtle, mace, palm kernel, beeswax, spermacetti, Chinese insect, mutton tallow, emulsifiable polyolefin waxes, such as polyethylene, polypropylene, polybutylene and copolymers thereof, waxes obtained by the hydrogenation of coconut oils or soybean oils, and the mineral waxes such as microcrystalline paraffin, ceresin, montan, ozokerite, and the like.

Wax film formers are commercially available as emulsions or dispersions which can be included as part of the polish composition as is without the addition of any further emulsifying and dispersing agents. Representative examples of such commercially available wax emulsions include Emulsion 341 supplied by Chemical Corporation of America and Poly N-110 supplied by Ionac Chemical, both of which are alkaline stable emulsions of an ethylene-propylene copolymer.

The polish composition preferably is compounded by admixing aqueous emulsions or dispersions of the film former, both the resin or synthetic polymers and the wax when used, with water in any convenient manner. In order to minimize the shocking effect the alkaline material might have on the dispersed film former, a diluted premix of the color indicator and the required amount of the alkaline material is prepared by admixing with sufficient water to adjust the pH of the premix to about 13. These two mixtures are then admixed, preferably are room temperature, to form the polish composition. The total amount of water in the resultant mixture is adjusted to provide the total solids content desired in the final product, which usually is within the range of about 8 to about 45 weight %, preferably about 12 to about 20 weight %, based on the total weight of the composition. Generally, higher contents of the polish ingredients provides a better gloss; however, higher contents tend to cause gelling of the film former upon admixture with the premix and also tend to cause the original color of the polish composition to disappear at a more rapid rate after application. The total content of the film former usually is within the range of about 6 to about 42 weight %, preferably about 10 to about 18 weight %, based on the total weight of the composition.

When the film formers are dispersed separately, rather than using commercially available emulsions or dispersions during compounding, anionic or nonionic emulsifying and dispersing agents well known and customarily used in the art generally are preferred. Suitable anionic emulsifying and dispersing agents include the sodium salts of the higher fatty acid sulfates, such as that of lauryl alcohol, the higher fatty acid salts, such as the oleates or stearates of morpholine, triethanolamine or mixed ethanolamines, or any of the nonionic types, such as ethylene oxide-modified alkyl phenols, of which tert-octyl phenol or nonyl phenol modified by 2 to 60, preferably 9 to 40, ethylene oxide units is representative, ethylene oxide-modified higher fatty alcohols, such as lauryl alcohol, containing 2 to 60 ethylene oxide units, similarly modified long-chain mercaptans, fatty acids, amines, or the like.

When the wax is added as a separate emulsion or dispersion, the emulsifying and dispersing agents mentioned above can be used; however, amine salts of soap, such as ethanolamine oleate or stearate, are most useful. Suitable agitating apparatus, such as a conventional homogenizing mill can be used to assist in forming the emulsion or dispersion. When an emulsifiable polyolefin is used as the wax, emulsions or dispersions thereof can be conveniently prepared by using conventional inversion emulsification techniques under superatmospheric pressure. In general, the emulsification or dispersion process includes admixing the wax, a nonionic emulsifying agent, and water at room temperature, and thereafter heating the resulting mixture in a pressure vessel up to at least autogenous pressure or above, stirring the mixture during heating, admixing additional amounts of water to achieve the desired solid content, and then cooling the resultant dispersion.

To facilitate film formation, conventional permanent and/or fugitive plasticizers can be included in the composition. Permanent plasticizers, if used in relatively large proportions, may tend to decrease the wear resistance and water resistance of the resulting film. Therefore, they should be used in relatively small amounts, generally not more than 3.0 weight %. When the polish composition includes acrylic copolymer film formers which are inherently tough and flexible, fugitive or semifugitive plasticizers, often also referred to as coalescing aids, may be preferred rather than or in addition to permanent plasticizers. As well recognized in the art, fugitive plasticizers or coalescing aids serve to partially deform the film formers during drying, so as to enhance the formation of a smooth, continuous film, and then evaporate. In order to facilitate the initial formation of a continuous film and impart some flexibility in the film, mixtures of fugitive and permanent plasticizers can be used. Significant amounts of fugitive plasticizers or coalescing aids tend to reduce the time of color retention after the polish composition has been applied. Therefore, amounts in excess of about 5 weight %, based on the total weight of the composition, should be avoided.

Representative examples of suitable fugitive plasticizers include high boiling alcohols and their ethers, such as monoethyl or monomethyl ether of diethylene glycol (Methyl Carbitol), ethylene glycol, diethylene glycol, isophorone, benzyl alcohol, and 3-met-oxybutanol-1. Representative examples of suitable essentially permanent plasticizers include benzyl butyl phthalate, dibutyl phthalate, dimethyl phthalate, triphenyl phosphate, triethyl phosphate, tributyl phosphate, 2-ethyl hexyl benzyl phthalate, butyl cyclohexyl phthalate, mixed benzoic acid and fatty acid esters of pentacrythritol, poly (propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene glycol diphthalate, di(methylcyclohexyl)phthalate, tributoxyethyl phosphate, and tributyl phosphate. The particular plasticizer and the amount thereof used are chosen in accordance with the demand for compatibility and efficiency in lowering the film-forming temperature. Some plasticizers, such as tributoxyethyl phosphate, also serve as leveling agents.

When used, the plasticizer or plasticizers preferably is admixed with the film former dispersion or emulsion prior to the addition of the premix containing the color indicator and the alkaline material. If organic solvents are used, relatively small amounts should be used because they tend to lower the inherent pH level of the solution due to less ionization and thereby inhibit color development.

Optional minor ingredients customarily used in the art can be added to the polish composition including surfactants or wetting agents, such as the fluorocarbon surface active agents disclosed in U.S. Pat. Nos. 3,163,547 and 2,937,098, anti-foaming agents, preservatives, such as formaldehyde, and fragrance additives when required to mask the odor of certain plasticizers. When wetting agents are used, the amount thereof should be kept to a minimum because of their tendency to cause foaming. Generally, amounts less than about 0.1 weight %, based on the total weight of the composition, are used.

While the polish composition of the invention can be used for a wide variety of applications, it is particularly suitable as a household floor polish for lighter-colored resilient floor coverings, such as linoleum (sheet vinyl) and asphalt, vinyl and vinyl-asbestos tile. When the polish composition is spread over the flooring with a conventional applicator, the colored liquid gradually turns colorless or clear within about 30 seconds to 2 minutes, depending upon the particular color indicator used and the amount thereof and the thickness of the composition applied. The time period for color retention can be extended somewhat by adding a suitable chelating agent, such as a nitrilotriacetic acid tridodium salt, ethylenediaminetetracetic acid and its sodium and calcium salts, glucoheptonates, and the like. The addition of such chelating agents is particularly effective for increasing the color retention time during recoating and increasing the intensity of the original color when relatively high contents of film formers are used and/or when the overall pH of the polish composition is lower. On the other hand, the presence of a chelating agent in the dried film tends to slightly inhibit the activation of the color when a cleaner or stripper solution is applied for removal of the film. When used, the amount of the chelating agent should be within the range of about 0.1 to about 2 weight %, based on the total weight of the composition.

It has been found that up to five coats of the polish composition can be applied before there is any significant effect on the color retention time. Therefore, in order to maximize the effect of the advantageous coloring feature provided by the polish composition, it is best not to apply more than about 5 coats before stripping.

As mentioned above, another important advantage of the polish composition is that the dried clear film will revert to the original color of the composition upon the application of an alkaline cleaning or stripping solution. On the other hand, the film can be cleaned with soapy solutions or diluted alkaline solutions without changing color. Either a solvent base or an amine base stripping solution can be used so long as the pH thereof is high enough to reactivate the particular color indicator contained as an integral part of the film.

Solvent base stripping solutions generally are preferred because they are more effective for all types of film formers, usually provide better color activation and the pH thereof can be increased to a level necessary to reactivate the color in the film without introducing the undesirable odor associated with amines. The solvent in such a stripping solution disrupts or partially dissolves the film in a manner so that the color indicator therein is exposed to the aqueous alkaline portion of the stripper solution and reverts back to its original color, thereby indicating that the film is ready for removal, such as by mopping, and oftentimes without the use of surface abrasion. The unremoved film retains its color as long as it remains wetted by the stripping solution, permitting one to readily observe whether or not all of the old film had been removed before the floor dries.

Solvents suitable for use in solvent base stripping solutions include glycol ethers, particularly those in the so-called Carbitol Cellusolve series, and weak alcohols, such as isopropyl alcohol. In any event, the solvent base stripping solution must be compatible with the particular type of floor covering. That is, it must not be so strong to deleteriously affect the flooring finish. When an alcohol is used, the quantity thereof must be below a level where the stripping solution becomes flammable within the meaning of various government regulations.

While solvent base stripping solutions generally are preferred for reasons mentioned above, their effectiveness is decreased much more rapidly with increased dilution with water than amine base stripping solutions. For example, it usually is not practical to use a water to solution dilution ratio much greater than about 3:1 or 4:1 without supplementing with substantial scrubbing or abrasion with a scrubbing device.

Amine base stripping solutions are quite effective for polish compositions containing metal-complexed or ionic-crosslinked acrylic copolymers. As used herein, the term "amine base stripping solutions" encompasses aqueous solutions containing ammonia or one or more amines as the primary active ingredient. The metal ions of such polymers preferentially complex with the ammonium and/or amino ions in the amine based stripping solution, thereby freeing the carbonyl groups so that the film becomes alkali-sensitive. This results in severe swelling of the polymer and eventual disruption of the film, exposing the color indicator therein to the aqueous alkaline portion of the stripping solution and causing the film to revert to its original color. As with a solvent based stripping solution, the unremoved film retains its color so long as it remains wetted by the amine base stripping solution.

Amines, other than ammonia, suitable for use in amine base stripping solutions include mono-, di- and triethanol amines, phenyl diethanol amines and 2-dimethylamino-2-methyl-1-propanol. Many amine based stripping solutions can be diluted with water to a water to solution ratio up to as high as 20:1 without supplementary abrasions, particularly when metal-complexed or ionic-crosslinked acrylic copolymer is used as the film former.

When there is a build-up of several coats of old film, it is best to allow the cleaning or stripping solution to stand, usually for 2 or more minutes, before mopping up so it can penetrate the film and effect the desired color change.

The following examples are presented to exemplify preferred embodiments of the invention and should not be construed as limitations thereof. In Examples 1 through 7, self-polishing compositions were prepared by admixing the color indicator, alkaline material and a portion of the water in a first vessel at room temperature to form a premix, admixing the other polish ingredients and the remaining portion of the water in a second vessel and stirring at room temperature for about 10 minutes or longer to complete migration of the plasticizers and then admixing the premix with the resultant dispersion in the second vessel at room temperature.

EXAMPLE 1

| Polish Formulation | |
|---|---|
| Constituent | Weight % |
| Premix: | |
| Deionized Water | 10.00 |
| Thymolphthalein | 0.06 |
| Potassium hydroxide, 45% solution | 3.40 |
| pH of premix = 13 | |
| Dispersion: | |
| Deionized Water | 52.14 |
| Surfactant[1] | 1.00 |
| Tributoxyethyl phosphate | 1.40 |
| Dibutyl phthalate | 0.80 |
| Diethylene glycol methyl ether | 0.60 |
| Acrylic metal crosslinked polymer emulsion, 40% solids[2] | 17.60 |
| Acrylic copolymer emulsion 38% solids[3] | 9.30 |
| Ethylene-propylene copolymer emulsion, 25% solids[4] | 3.70 |
| pH of dispersion = 8.4 | 100.00 |

Notes:
[1]Fluorad FC-120, an anionic type fluorocarbon surface active agent containing 1% active ingredients supplied by 3M Co.
[2]Rhoplex B-832, supplied by Rohm and Haas Co.
[3]Richamer R-900, supplied by The Richardson Co.
[4]Emulsion 341, supplied by Chemical Corp. of America The resultant polish composition had a total solids content (including plasticizers and alkali) of 15.53 weight %, polish solids content (film-formers only) of 11.5 weight %, a vivid blue color and a pH of 12.8. This composition was spread over a vinyl-asbestos floor tile with a conventional polyurethane sponge mop applicator and it retained a vivid blue color for about 80 seconds after which it turned clear and colorless and subsequently dried to form a bright, smooth, continuous coating on the tile. The coated tile was subjected to periodic washings with a detergent cleaning solution and wear tests. The coating remained colorless and exhibited good wear and scuff resistance.

EXAMPLE 2

| Polish Formulation | |
|---|---|
| Constituent | Weight % |
| Premix: | |
| Deionized Water | 10.0 |
| Potassium hydroxide, 45% solution | 2.6 |
| Phenolphthalein | 0.1 |
| Dispersion: | |
| Deionized Water | 51.7 |
| Surfactant[5] | 1.0 |
| Tributoxyethyl phosphate | 0.6 |
| Diethylene glycol methyl ether | 4.0 |
| Acrylic metal crosslinked polymer emulsion, 40% solids[2] | 23.0 |
| Alkali-soluble resin emulsion, 25% solids[6] | 4.0 |
| Ethylene-propylene copolymer nonionic emulsion, 35% solids[7] | 3.0 |
| | 100.0 |

Notes:
[2]See Example 1
[5]Zonyl FSP, an emulsion of a fluorocarbon surface active agent containing 1% active ingredients, supplied by E. I. DuPont de Nemours and Co.
[6]Acrysol 527, supplied by Rohm and Haas Co.
[7]A nonionic emulsion prepared from ethylene-propylene copolymer AC-392 supplied by Allied Chemical.

The resultant polish composition had a total solids content of 13.12 weight %, polish solids content of 11.25%, a red color, a pH of 12.2 and dried to provide a smooth, colorless, protective film when applied on vinyl-asbestos floor tile.

EXAMPLE 3

| Polish Formulation | |
|---|---|
| Constituent | Weight % |
| Premix: | |
| Deionized Water | 10.00 |
| Potassium hydroxide, 45% solution | 3.00 |
| Zinc octoate, 18% solution | 0.20 |
| Phenolphthalein | 0.14 |
| Dispersion: | |
| Deionized Water | 56.45 |
| Surfactant[8] | 1.00 |
| Anti-foaming agent[9] | 0.01 |
| Tributoxyethyl phosphate | 0.60 |
| Diethylene glycol methyl ether | 0.60 |
| Polyethylene glycol, 25% solution | 3.00 |
| Acrylic copolymer emulsion, 48.5% solids[10] | 25.00 |
| | 100.00 |

Notes:
[8]Zonyl FSP, an emulsion of a fluorocarbon surface active agent containing 10% active ingredients supplied by E.I. Du Pont de Nemours and Co.
[9]SAG 4220, an organo-modified polysiloxane polymer emulsion containing 20% active ingredients supplied by Union Carbide.
[10]Ionac X-180, supplied by Ionac Chemical.

The resultant polish composition had a total solids content of 15.00 weight %, polish solids content of 12.875 weight %, a red color and dried to provide a smooth, colorless, protective film when applied on vinyl-asbestos floor tile.

EXAMPLE 4

| Polish Formulation | |
|---|---|
| Constituent | Weight % |
| Premix: | |
| Deionized Water | 10.000 |
| Potassium hydroxide, 45% solution | 2.000 |
| Ethyl bis (2,4-14 dinitrophenyl) acetate | 0.004 |
| Dispersion: | |
| Deionized Water | 49.396 |
| Surfactant[8] | 1.000 |
| Tributoxyethyl phosphate | 0.600 |
| Diethylene glycol methyl ether | 2.000 |
| Coalescing aid[11] | 2.000 |
| Acrylic copolymer emulsion, 40% solids[12] | 30.000 |
| Ethylene-propylene copolymer emulsion, 25% solids[4] | 3.000 |

-continued

| Polish Formulation | |
|---|---|
| Constituent | Weight % |
| | 100.000 |

Notes:
(4)See Example 1
(6)See Example 3
(11)Dalpad A, supplied by Dow Chemical Co.
(12)Crilicon 642 supplied by Ionac Chemical The resultant polish composition had a total solids content of 15.00 weight %, polish solids content of 12.75 weight %, a blueish green color, a pH of 11.9 and dried to form a smooth, colorless, protective film when applied on vinyl-asbestos floor tile.

EXAMPLE 5

| Polish Formulation | |
|---|---|
| Constituent | Weight % |
| Premix: | |
| Deionized Water | 10.00 |
| Ortho-cresylphthalein | 0.06 |
| Monoethanolamine | 3.40 |
| Potassium hydroxide, 45% solution | 1.00 |
| Dispersion: | |
| Deionized Water | 52.34 |
| Surfactant(5) | 0.80 |
| Sodium metabisulfite | 0.20 |
| Tributoxyethyl phosphate | 0.60 |
| Diethylene glycol methyl ether | 0.60 |
| Acrylic copolymer emulsion, 40% solids(12) | 26.00 |
| Ethylene-propylene copolymer emulsion, 25% solids(4) | 5.00 |
| | 100.00 |

Notes:
(4)See Example 1
(5)See Example 2
(12)See Example 4

The resultant polish composition had a total solids content of 16.3 weight %, polish solids content of 11.65 weight %, a reddish purple color and dried to provide a smooth, colorless, protective film when applied on vinyl-asbestos floor tile.

EXAMPLE 6

| Polish Formulation | |
|---|---|
| Constituent | Weight % |
| Premix: | |
| Deionized Water | 10.00 |
| Thymolphthalein | 0.06 |
| Potassium hydroxide, 45% solution | 3.60 |
| Dispersion: | |
| Deionized Water | 34.34 |
| Surfactant(1) | 1.00 |
| Tetrasodium salt nitrilotriacetic acid, 40% solution | 1.00 |
| Acrylic copolymer emulsion, 32% solids(13) | 40.00 |
| Alkali-soluble resin emulsion, 25% solids(6) | 5.00 |
| Ethylene-propylene copolymer emulsion, 25% solids(14) | 5.00 |
| | 100.00 |

Notes:
(1)See Example 1
(2)See Example 2
(13)Neocryl A-602, supplied by Polyvinyl Chemical Industries
(14)Poly N-110, supplied by Ionac Chemical The resultant polish composition had a total solids content of 17.38 weight %, polish solids content of 15.3 weight %, a blue color a pH of 12.8 and dried to provide a smooth, colorless, protective film when applied on vinyl-asbestos floor tile.

EXAMPLE 7

| Polish Formulation | |
|---|---|
| Constituent | Weight % |
| Premix: | |
| Deionized Water | 10.0 |
| Phenolphthalein | 0.2 |
| Potassium hydroxide, 45% solution | 3.4 |
| Dispersion: | |
| Deionized Water | 44.8 |
| Surfactant(1) | 1.6 |
| Tributoxyethyl phosphate | 1.0 |
| Diethylene glycol methyl ether | 2.0 |
| Tetrasodium salt nitrilotriacetic acid, 40% solution | 1.0 |
| Acrylic copolymer emulsion, 38% solids(3) | 30.0 |
| Ethylene-propylene copolymer emulsion, 25% solids(4) | 6.0 |
| | 100.0 |

Notes:
(1)See Example 1
(3)See Example 1
(4)See Example 1

The resultant polish composition had a total solids content of 16.03 weight %, polish solids content of 12.9 weight %, a red color and dried to provide a smooth, colorless, protective film when applied to vinyl-asbestos floor tile.

EXAMPLE 8

Aqueous cleaning and stripping compositions were prepared with the following formulations:

| Formulation A (Ammonia Type, Low pH) | |
|---|---|
| Constituent | Weight % |
| Deionized Water | 84.00 |
| Nonylphenoxy polyethoxy ethanol(1) | 0.44 |
| Diethanolamine | 1.70 |
| Potassium hydroxide, 45% solution | 0.30 |
| Tetrapotassium pyrophosphate | 4.91 |
| Tall oil fatty acid | 3.56 |
| Ammonium hydroxide, 26° Be' | 4.81 |
| Fragrance | .28 |
| | 100.00 |

At full concentration, pH was 11.1 to 11.2 and at a dilution ratio of 1:5 with wter, pH was 10.7.

Notes:
(1)Triton N-101 supplied by Rohm and Haas Co., contains 9.5 moles of ethylene oxide.

At full concentration, pH was 11.1 to 11.2 and at a dilution ratio of 1:5 with water, pH was 10.7.

| Formulation B (Ammonia Type, High pH) | |
|---|---|
| Constituent | Weight % |
| Deionized Water | 83.01 |
| Nonylphenoxy polyethoxy ethanol(1) | 1.40 |
| Sodium metasilicate pentahydrate | 9.70 |
| Tall oil fatty acid | 1.03 |
| Ammonium hydroxide, 26° Be' | 4.83 |
| Fragrance and color | .03 |
| | 100.00 |

At full concentration, pH was 13.0 – 13.1 and at dilution ratios of 1:4 and 1:80 with water, pH was 12.45 and 10.9, respectively.

Notes:
(1)Triton N-101 supplied by Rohm and Haas Co., contains 9.5 moles of ethylene oxide.

At full concentration, pH was 13.0–13.1 and at dilution ratios of 1:4 and 1:80 with water, pH was 12.45 and 10.9, respectively.

| Formulation C (Amine Type) | |
|---|---|
| Constituent | Weight % |
| Deionized Water | 85.8 |
| Ethylene oxide-propylene oxide[(2)] block copolymer | 2.0 |
| Sodium metasilicate pentahydrate | 3.0 |
| Monoethanolamine | 6.0 |
| Diethylene glycol methyl ether | 3.0 |
| Fragrance and color | 0.2 |
| | 100.0 |

At full concentration, pH was 12.9 and at dilution ratios of 1:4 and 1:10 with water, pH was 12.0 and 11.65, respectively.

Notes:
[(2)]Pluronic L-64 supplied by BSAF Wyandotte, molecular weight of 4375.

At full concentration, pH was 12.9 and at dilution ratios of 1:4 and 1:10 with water, pH was 12.0 and 11.65, respectively.

| Formulation D (Solvent Type) | |
|---|---|
| Constituent | Weight % |
| Deionized Water | 78.87 |
| Nonylphenoxy-polyethoxy ethanol[(1)] | 1.40 |
| Sodium metasilicate pentahydrate | 9.90 |
| Tall oil fatty acid | 1.03 |
| Ethylene glycol n-butyl ethanol | 8.50 |
| Color and fragrance | 0.30 |
| | 100.00 |

At full concentration, pH was 13.0 to 13.1 and at dilution rations of 1:1 and 1:43 with water, pH was 12.9 and 11.4, respectively.

Notes:
[(1)]Triton N-101 supplied by Rohm and Haas Co., contains 9.5 moles of ethylene oxide.

At full concentration, pH was 13.0 to 13.1 and at dilution rations of 1:1 and 1:43 with water, pH was 12.9 and 11.4, respectively.

EXAMPLE 9

Four coats of the preferred polish composition of Example 1 were applied to vinyl-asbestos flooring over a period of four weeks, one coat being applied each seven days without intermittent surface washing or cleaning. The preferred Formula D cleaning solution of Example 8 at a dilution ratio of 1:43 (pH = 11.4) was applied to the built-up film and the color was not reactivated. According to published pH indicator charts, thymolphthalein show a definite blue color at a pH of 10.2 and a dark blue color at a pH of 10.6

When the same cleaning solution was applied at a dilution ratio of 1:1 (pH = 12.9), the film changed to a dark blue color. The disrupted and/or partially dissolved film was mopped up so there was no blue color remaining on the surface of the floor. After drying, the floor had a uniformly clean appearance with a noticeable absence of any polish film.

EXAMPLE 10

Tests similar to those described in Example 9 were performed using Formula C cleaning solution of Example 8 at a dilution ratio of 1:10 (pH = 11.65). The built-up film changed to a blue color; however, it was much less intense than was developed with the Formula D solution diluted to a 1:1 ratio. The built-up film was sufficiently disrupted (apparently by the metal ions of the acrylic copolymer in the film preferentially complexing with ammonium ions in the cleaning solution) so that film was completely removed by scrubbing and mopping and the floor had a uniformly clean and polish-stripped appearance after drying.

EXAMPLE 11

Formula A and B cleaning solutions of Example 8 was applied at concentrations giving a pH below about 10.5 or lower to films formed from all the polish compositions described in Examples 1 through 7 and none of the films reverted to the original color of the composition. When the concentrations thereof were such that the pH was above 10.5, the films formed from polish compositions of Examples 2, 3 and 7 containing phenolphthalein changed to a distinctive pink color. However, Formula A cleaning solution did not change the color of the films formed from the polish composition of Examples 1 and 6 containing thymolphthalein even at full concentration and Formula B cleaning solution did not change the color at concentrations where the pH was below about 11.65.

EXAMPLE 12

Formula D cleaning solution of Example 8 was applied at full concentration (pH = 13.0–13.1) to a dried film formed from the polish composition of Example 3 containing phenolphthalein and the film turned a bright pink color. This demonstrates the ingredients of the polish composition causes a substantial shift in the pH at which acid base indicator normally undergo colorless changes because the published pH indicator charts indicate that phenolphthalein is colorless when in the presence of a pH greater than 10 to 10.5.

From the above test, it can be seen that the aqueous base polish compositions of the invention provide the user with an indicating means which permits him to easily ascertain that he has not missed any spots during application and, with the use of an aqueous stripping solution having the proper alkalinity of pH, permits him to determine whether all of the old film has been removed without waiting for the floor to become completely dry.

From the foregoing description, one skilled in the art can easily ascertain the essential characteristics of the invention, and without departing from the spirit and scope thereof, can make various changes and modifications to adapt it to various usages and conditions.

I claim:

1. An aqueous polish composition driable to provide a substantially clear finish on a substrate to which the polish composition is applied comprising
   an aqueous phase;
   a non-volatile, solid film former, which is capable of forming a smooth, substantially colorless, protective film on the substrate, uniformly dispersed in said aqueous phase;
   a sufficient amount of a dispersing agent to form a stable dispersion of said film former in said aqueous phase and to permit said film former upon evaporation of the water to deposit therefrom as a smooth film on the substrate;
   a water-soluble, acid-base indicator which is colored at a pH above a predetermined level and is colorless at a lower pH in an amount sufficient to impart a distinctive color to said composition when the overall pH of said composition is above said predetermined level; and
   a sufficient quantity of an alkaline material capable of solubilizing in said aqueous dispersion to raise the overall pH of said composition above said predetermined level, said film former, said dispersing agent and said alkaline material having a coloration which does not mask the color imparted to said composition by said indicator;

whereby, after application on the substrate, said composition retains its original color for a finite time period while in the liquid state and then becomes substantially colorless as the water evaporates during formation of the film.

2. A polish composition according to claim 1 wherein said indicator is selected from the group consisting of thymolphthalein, phenolphthalein, ortho-cresolphthalein, ethyl bis (2,4-dinitrophenyl) acetate, p-nitrophenol, m-nitrophenol, m-dinitrophenol, 1,3,5-trinitrophenol, and 2,4,6-trinitrophenol.

3. A polish composition according to claim 2 wherein said indicator is selected from the group consisting of thymolphthalein, phenolphthalein, ortho-cresolphthalein and ethyl bis (2,4-dinitrophenol) acetate.

4. A polish composition according to claim 3 wherein the amount of said indicator is within the range of about 0.003 to about 2 weight %, based on the total weight of said composition.

5. A polish composition according to claim 2 wherein said composition has a pH at least 11.

6. A polish composition according to claim 5 where said film former includes an emulsifiable acrylic copolymer.

7. A polish composition according to claim 6 wherein said acrylic copolymer is ionic-crosslinked with a water-dispersible polyvalent metal compound.

8. A polish composition according to claim 5 wherein said film former includes a wax.

9. A polish composition according to claim 5 wherein said composition contains a plasticizer.

10. A polish composition according to claim 5 wherein said film former includes an alkali-soluble resin.

11. A polish composition according to claim 5 wherein said composition contains a surfactant.

12. A polish composition according to claim 5 wherein said composition contains a chelating agent in an amount within the range of about 0.1 to about 2 weight %, based on the total weight of the composition.

13. A polish composition according to claim 5 wherein the total solids content of said composition is within the range of about 6 to about 45 weight %, based on the total weight of said composition.

14. An aqueous floor polish composition driable to provide substantially clear finish on a substrate to which the polish composition is applied comprising
an aqueous phase;
a non-volatile film former, which is capable of forming a smooth, substantially colorless, protective film on the substrate and includes an emulsifiable acrylic copolymer, uniformly dispersed in said aqueous phase;
a sufficient amount of a dispersing agent to form a stable dispersion of said film former in said aqueous phase and to permit said film former upon evaporation of the water to deposit therefrom as smooth film on the flooring;
a water-soluble, acid-base indicator selected from the group consisting of thymolphthalein, phenolphthalein, orthocresolphthalein, and ethyl bis (2,4-dinitrophenol) acetate in a sufficient quantity to impart a distinctive color to said composition when the pH of said composition is at a level high enough for said indicator to change from colorless to a color; and
a sufficient quantity of an alkaline material capable of solubilizing in said aqueous dispersion to raise the pH of said composition to said level, said film former, said dispersing agent and said alkaline material having a coloration which does not mask the color imparted to said composition by said indicator;

whereby, after application on the resilient flooring, said composition retains its original color for a finite time period while in the liquid state and then becomes substantially colorless as the water evaporates during the film formation.

15. A floor polish composition according to claim 14 wherein the amount of said indicator is within the range of about 0.003 to about 2 weight %, based on the total weight of the composition and the pH of said composition is at least 11.

16. A floor polish composition according to claim 15 wherein the total solids content of said composition is within the range of about 6 to about 45 weight %, based on the total weight of the composition.

17. A floor polish composition according to claim 16 wherein said composition contains a surfactant.

18. A floor polish composition according to claim 17 wherein said film former includes a wax and said composition contains a plasticizer.

19. A floor polish composition according to claim 16 wherein said composition contains a chelating agent in an amount within the range of about 0.1 to about 2 weight %, based on the total weight of the composition.

20. A floor polish composition according to claim 16 wherein said acrylic copolymer is ionic-crosslinked with a water-soluble polyvalent metal compound.

21. A method for treating and preserving the surface of a substrate comprising
applying on the surface of the substrate an aqueous alkaline polish composition which is driable to a substantially clear finish and includes as its essential ingredients:
an aqueous base,
a non-volatile, solid film former, which is capable of forming a smooth, substantially colorless, protective film on the substrate and includes an emulsifiable acrylic copolymer, uniformly dispersed in said aqueous phase,
a sufficient amount of a dispersing agent to form a stable dispersion of said film former in said aqueous phase and to permit said film former upon evaporation of the water to deposit therefrom as a smooth film on the substrate,
a water-soluble acid-base indicator which is colored above a predetermined level and is colorless at a lower pH, in an amount sufficient to impart a distinctive color to said composition when the overall pH of said composition is above said predetermined level, and
a sufficient amount of an alkaline material capable of solubilizing in said aqueous dispersion to raise the pH of said composition to said predetermined level, said film former, said dispersing agent and said alkaline material having coloration which does not mask the color imparted to said composition by said indicator,
whereby, after application on the substrate, said composition retains its original color for a finite time period while in the liquid state and then becomes substantially colorless as the water evaporates, the resultant, dried protective film containing said indicator.

22. A method according to claim 21 wherein said indicator is selected from the group consisting of thymolphthalein, phenolphthalein, ortho-cresolphthalein, and ethyl bis (2,4-nitrophenol) acetate and the amount thereof is within the range of about 0.003 to about 2 weight %, based on the total weight of said polish composition.

23. A method according to claim 21 including the further step of removing the dried film from the substrate when desired by applying thereto a cleaning solution which includes an aqueous alkaline portion having a pH above said predetermined level and is capable of disrupting the dried film sufficiently to permit removal thereof from the substrate and expose said indicator in the film to the aqueous alkaline portion of the cleaning solution so as to cause said indicator to revert to the color it possessed prior to application of said composition.

* * * * *